(12) United States Patent
Frid et al.

(10) Patent No.: US 12,039,179 B2
(45) Date of Patent: Jul. 16, 2024

(54) FINDING AND RELEASING TRAPPED MEMORY IN uLAYER

(71) Applicant: Western Digital Technologies, Inc., San Jose, CA (US)

(72) Inventors: Marina Frid, Jerusalem (IL); Igor Genshaft, Bat Yam (IL)

(73) Assignee: Sandisk Technologies, Inc., Austin, TX (US)

( * ) Notice: Subject to any disclaimer, the term of this patent is extended or adjusted under 35 U.S.C. 154(b) by 106 days.

(21) Appl. No.: 17/956,783

(22) Filed: Sep. 29, 2022

(65) Prior Publication Data
US 2024/0111443 A1    Apr. 4, 2024

(51) Int. Cl.
*G06F 3/06*        (2006.01)
*G06F 12/0804*    (2016.01)

(52) U.S. Cl.
CPC ............ *G06F 3/064* (2013.01); *G06F 3/0608* (2013.01); *G06F 3/0673* (2013.01); *G06F 12/0804* (2013.01); *G06F 2212/1044* (2013.01)

(58) Field of Classification Search
CPC ......... G06F 12/0804; G06F 2212/1044; G06F 3/064; G06F 3/0608; G06F 3/0673
USPC ......................................................... 711/104
See application file for complete search history.

(56) References Cited

U.S. PATENT DOCUMENTS

| | | |
|---|---|---|
| 8,335,907 B2 | 12/2012 | Sinclair et al. |
| 8,756,375 B2 | 6/2014 | Flynn |
| 10,459,636 B2 | 10/2019 | Frid et al. |
| 10,528,463 B2 | 1/2020 | Li et al. |
| 10,802,744 B2 | 10/2020 | Frid et al. |
| 11,055,230 B2 | 7/2021 | Haswell |
| 11,199,983 B2 | 12/2021 | Frid et al. |
| 2009/0193192 A1* | 7/2009 | Burckhardt ......... G06F 12/0831 711/124 |
| 2010/0037012 A1* | 2/2010 | Yano ..................... G06F 3/0616 711/E12.008 |
| 2015/0169458 A1* | 6/2015 | Purkayastha ....... G06F 12/0886 711/122 |
| 2017/0285948 A1* | 10/2017 | Thomas ................ G06F 3/0616 |
| 2018/0349041 A1* | 12/2018 | Zhou ..................... G06F 3/0619 |
| 2020/0081645 A1 | 3/2020 | Frid et al. |
| 2020/0225882 A1* | 7/2020 | Li ........................ G06F 12/0246 |
| 2020/0409554 A1 | 12/2020 | Srimal et al. |

(Continued)

*Primary Examiner* — Hashem Farrokh
(74) *Attorney, Agent, or Firm* — PATTERSON + SHERIDAN, LLP (57) ABSTRACT

The present disclosure generally relates to improving memory management. When valid mSets are relocated via mBlock compaction, the uLayer will have some updates for the mSet and consolidation of the mSet will write the mSet to mBlock once more. The disclosure herein reduces the impact of the problem that the same more frequently updated mSets uRegions are consolidated many times and written to flash where the less updated mSets uRegions become trapped uRegions in the uLayer reducing the uLayer capacity and efficacy. The disclosure provides guidance on how to synchronize the uLayer consolidations efficiently and preventing trapping of unused uRegions in the uLayer that reduces the uLayer capacity and efficiency. The synchronizing is between the uLayer consolidation to the mLayer and the mBlock compaction process such that the smaller uLayer efficacy will not be reduced due to trapped uRegions that are less frequently updated.

19 Claims, 7 Drawing Sheets

(56) References Cited

U.S. PATENT DOCUMENTS

2021/0349830 A1 11/2021 Balluchi et al.
2022/0012176 A1* 1/2022 Bert .................... G06F 12/0871

* cited by examiner

FINDING AND RELEASING TRAPPED MEMORY IN uLAYER

BACKGROUND OF THE DISCLOSURE

Field of the Disclosure

Embodiments of the present disclosure generally relate to improving memory management.

Description of the Related Art

Storage devices use logical-to-physical (L2P) mapping and use management tables with control data for the dynamic mapping. The management tables are stored in flash memory, but in order to provide high performance management, copies are maintained in the controller RAM.

Depending on the host workload, the L2P mapping can be random or contain sequences of different length. Random mapping can be effectively stored in directly accessed Mapping Master Layer (mLayer). The mLayer is an array of physical locations indexed by logical locations. The approach is not efficient for sequential mapping because the data will occupy as many array elements as long as the sequential range that is being mapped is. So, although sequential mapping can be potentially stored in a compressed form, the sequential mapping actually occupies in the mLayer the same space as random mapping for the same amount of LBAs does.

Dual-layered mapping architecture consists of a mLayer and an update layer (uLayer). The mLayer size is relatively big and the structure is a regular direct-access array. The uLayer size is much smaller and the structure is less regular, meaning the mapping of the same LBA range can have different sizes at different times. The size of the uLayer is proportional to the capacity of the device. For high-end devices, the storage size does not lead to any problems because the high-end devices contain RAM proportional to the capacity and can keep the entire uLayer in RAM. However, devices with low RAM have a limited amount of RAM and can keep the uLayer only of a constant size regardless of the device's capacity.

The uLayer can aggregate the latest updates for data in regions that make up the uLayer, called uRegions. The uLayer can then be used to consolidate the latest updates to a master set (mSet) once the uRegions have become full and then save the mSet to the flash, in a master block (mBlock). The process of consolidation is performed in SRAM. The consolidation is responsible for freeing space available in the uLayer. Consolidation removes update runs (uRuns) from the uLayer after updated the mSet and writing the mSet back to an mBlock.

The mLayer allows the device to save consolidated mSets to an mBlock and invalidate previous mSets in the mBlock. The mLayer may perform compaction on mBlocks with max obsolete data, to reduce the amount of space allocated to obsolete data.

The two FTL management schemes, uLayer consolidation to mLayer and compaction of mBlocks, need to be synchronized such that the smaller uLayer does not become a bottleneck and will not overflow with updates. Further, the synchronization can prevent either inefficient uLayer consolidation or unnecessary excessive compaction operations of mBlocks to flash, which reduces performance by consuming time and increasing write amplification.

The current strategy for freeing space in the uLayer is to select the uRegions for consolidation with maximum uRuns in the uRegion. While consolidating uRegions with maximum uRuns provides fast freeing of space in the uLayer, the strategy leads to the problem of 'trapped' uRuns in uRegions containing only a few uRuns and therefore never selected for consolidation. A few uRuns in an uRegion might mean the uRegion has not been filled yet in a current write process or that the uRegion has not been used for a long time. Therefore, identifying trapped uRuns can be difficult to differentiate from uRuns still being written to an uRegion.

Therefore, there is a need in the art for a process of memory management that does not result in trapped uRuns in a uLayer.

SUMMARY OF THE DISCLOSURE

The present disclosure generally relates to improving memory management. When valid mSets are relocated via mBlock compaction, the uLayer will have some updates for the mSet and consolidation of the mSet will write the mSet to mBlock once more. The disclosure herein reduces the impact of the problem that the same more frequently updated mSets uRegions are consolidated many times and written to flash where the less updated mSets uRegions become trapped uRegions in the uLayer reducing the uLayer capacity and efficacy. The disclosure provides guidance on how to synchronize the uLayer consolidations efficiently and preventing trapping of unused uRegions in the uLayer that reduces the uLayer capacity and efficiency. The synchronizing is between the uLayer consolidation to the mLayer and the mBlock compaction process such that the smaller uLayer efficacy will not be reduced due to trapped uRegions that are less frequently updated.

In one embodiment, a data storage device comprises: a memory device and a controller coupled to the memory device, wherein the controller is configured to determine a compaction process to be performed for one or more mBlocks, wherein the one or more mBlocks comprise one or more mSets; check a uLayer for updates for the one or more mSets; consolidate uRegions with at least one update for the one or more mSets; update the one or more mSets with the consolidated uRegions with at least one update; and write the updated one or more mSets to a destination block.

In another embodiment, a data storage device comprises: a memory device and a controller coupled to the memory device, wherein the controller is configured to select a source block for relocation, wherein the source block comprises a valid mSet, update the valid mSet, and write the updated valid mSet to a destination block.

In another embodiment, a data storage device comprises: a memory means and a controller coupled to the memory means, wherein the controller is configured to determine an mBlock in a first location needs relocation, combine the mBlock with uLayer updates, and write the combined mSet and uLayer updates as a new mSet in a second location distinct from the first location.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improving memory management. When valid mSets are relocated via mBlock compaction, the uLayer will have some updates for the mSet and consolidation of the mSet will write the mSet to mBlock once more. The disclosure herein reduces the impact of the problem that the same more frequently updated mSets uRegions are consolidated many times and written to flash where the less updated mSets uRegions become trapped uRegions in the uLayer reducing the uLayer capacity and efficacy. The disclosure provides guidance on how to synchronize the uLayer consolidations efficiently and preventing trapping of unused uRegions in the uLayer that reduces the uLayer capacity and efficiency. The synchronizing is between the uLayer consolidation to the mLayer and the mBlock compaction process such that the smaller uLayer efficacy will not be reduced due to trapped uRegions that are less frequently updated.

Figure 1:
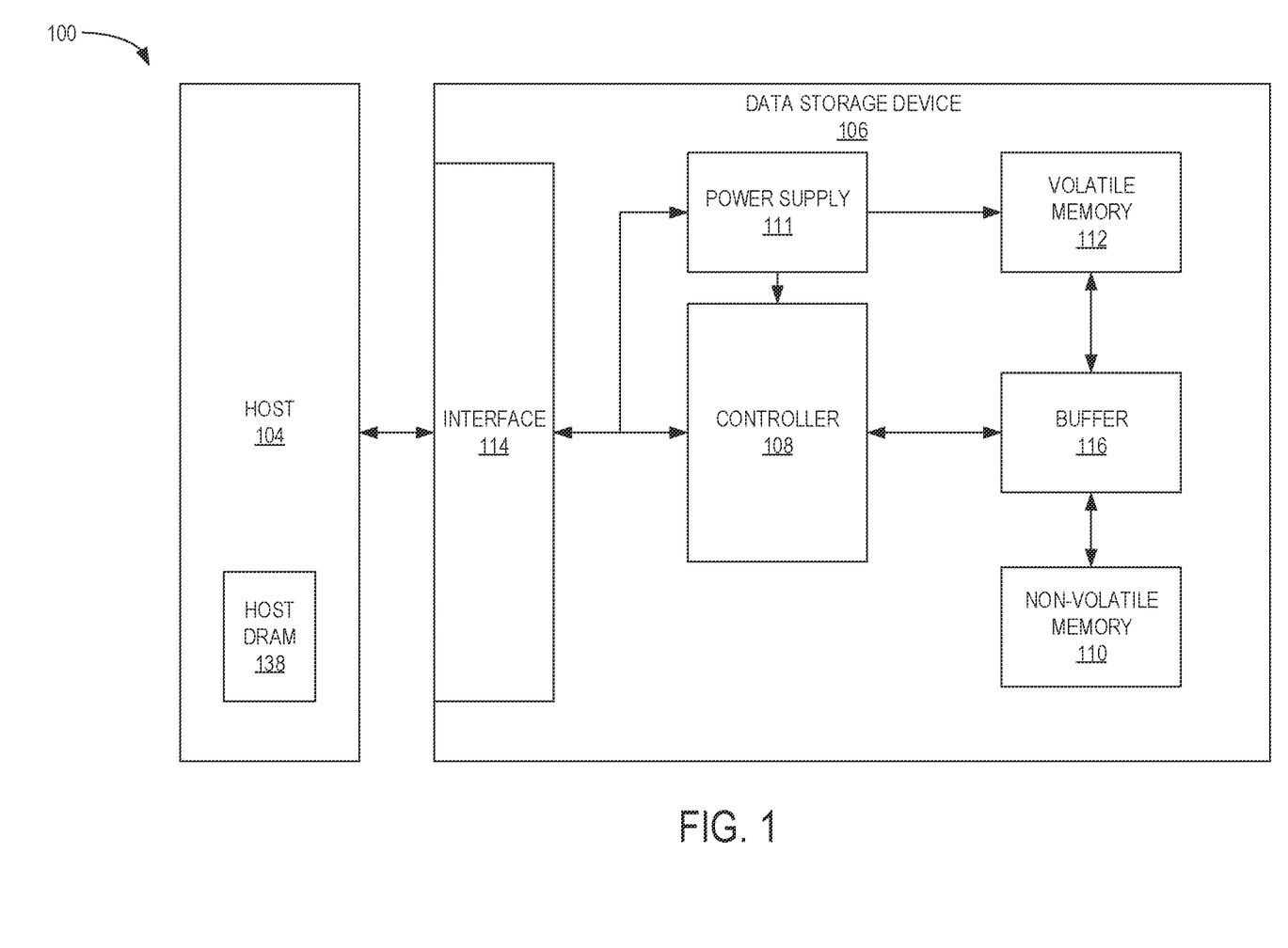
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (La, laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CM), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 20 or 3D devices and may be single level cell (SLC), cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in an internal memory of the controller 108 (i.e., a second volatile memory), which may be SRAM memory, prior to sending the data to the NVM 110.

Figure 2:
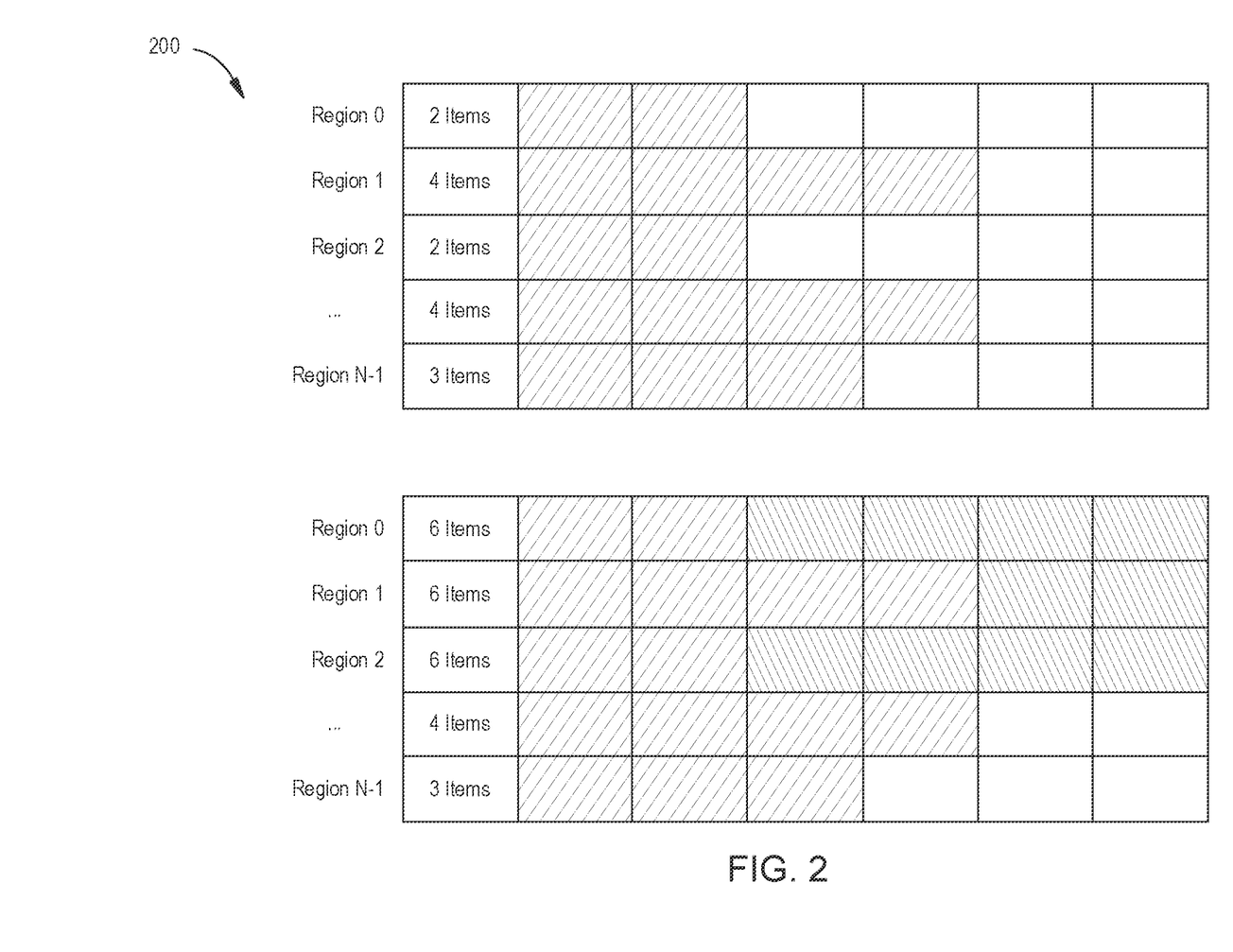
FIG. 2 is an illustration example of inefficient uLayer memory usage resulting in trapped updates.

FIG. 2 is an illustration example 200 of inefficient uLayer memory usage resulting in trapped updates. FIG. 2 depicts an example where all N uRegions, where N could equal 256 for example, were updated on a sequential precondition that touched all N uRegions. Then, as shown in the second image, only uRegions 0-2 are randomly updated and hence are consolidated and written to flash frequently while other uRegions, for example uRegions 3-256, which are not updated remain trapped in the uLayer. The uRegions are not consolidated to the related mSets and in addition they occupy the limited available SRAM space for the uLayer.

Each uRegion with a small number of updates, uRegions 3-256 in the continued example, never triggers consolidation, because the only uRegions with a maximum number of updates triggers consolidation. Thus, inefficient uLayer memory usage leads to inefficient accumulation in the corresponding mSets of those uRegions, mSets 0-2 in this instance, and that leads to back-to-back consolidations of uRegions which leads to many mBlock compactions.

Figure 3:
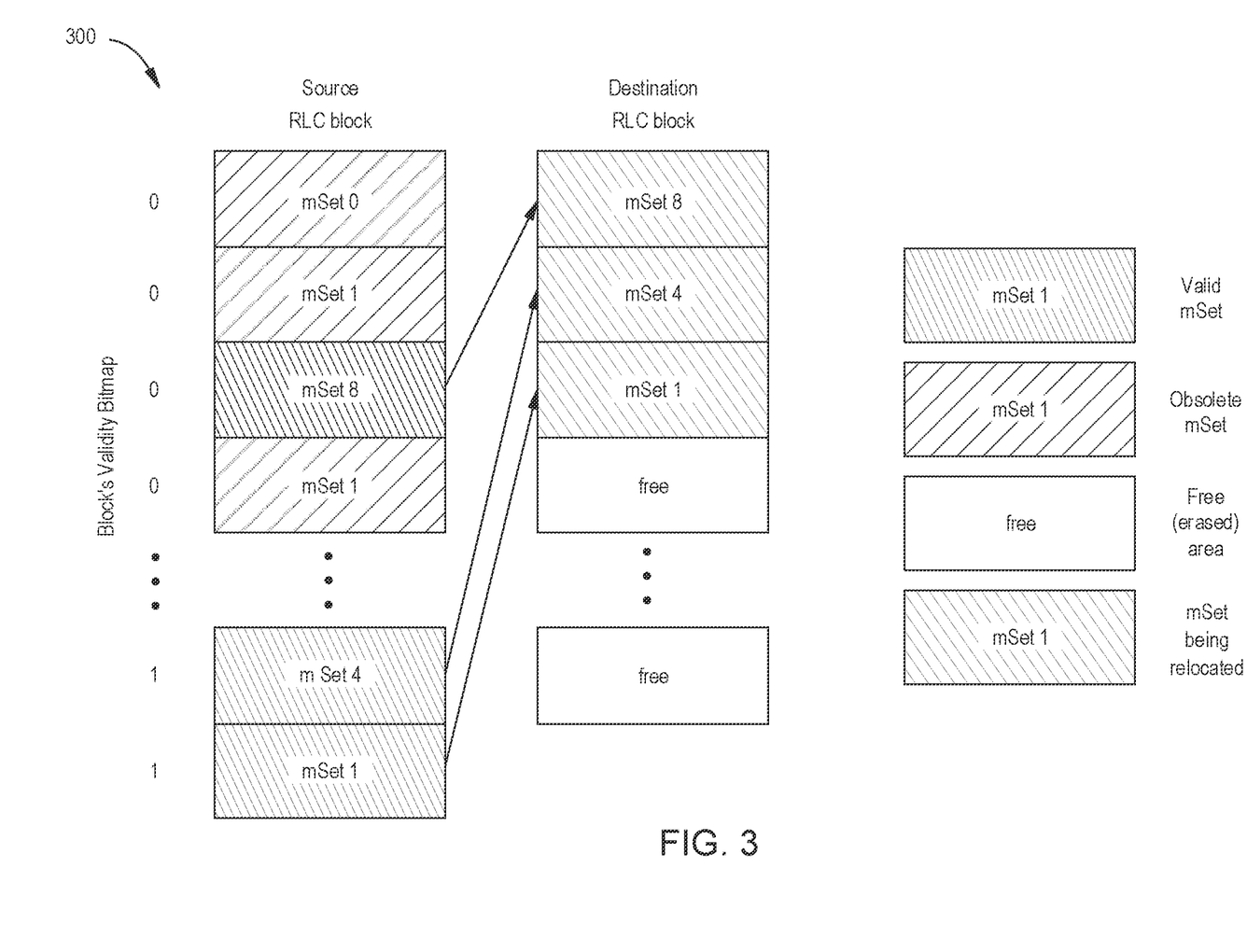
FIG. 3 is an illustration of an mBlock compaction process.

FIG. 3 is an illustration 300 of an mBlock compaction process. When an mBlock is chosen for compaction, the mBlock is scanned for valid and obsolete mSets. Obsolete mSets are mSets that have a more recently written version in the mBlock. Valid mSets are the most recently written version of an mSet in the mBlock. Valid mSets are not required to be up to date, and may likely have updates waiting in the uLayer.

For example, in FIG. 3 there are three total versions of mSet 1 in the source mBlock. Therefore, there are two obsolete versions of mSet 1 and one valid version of mSet 1. The valid mSets are identified with a validity bitmap before being relocated to a new mBlock identified as the destination mBlock. The destination mBlock is a new mBlock distinct from the source mBlock. After the valid mSets have been copied to the destination mBlock, the source mBlock is erased.

Figure 4:
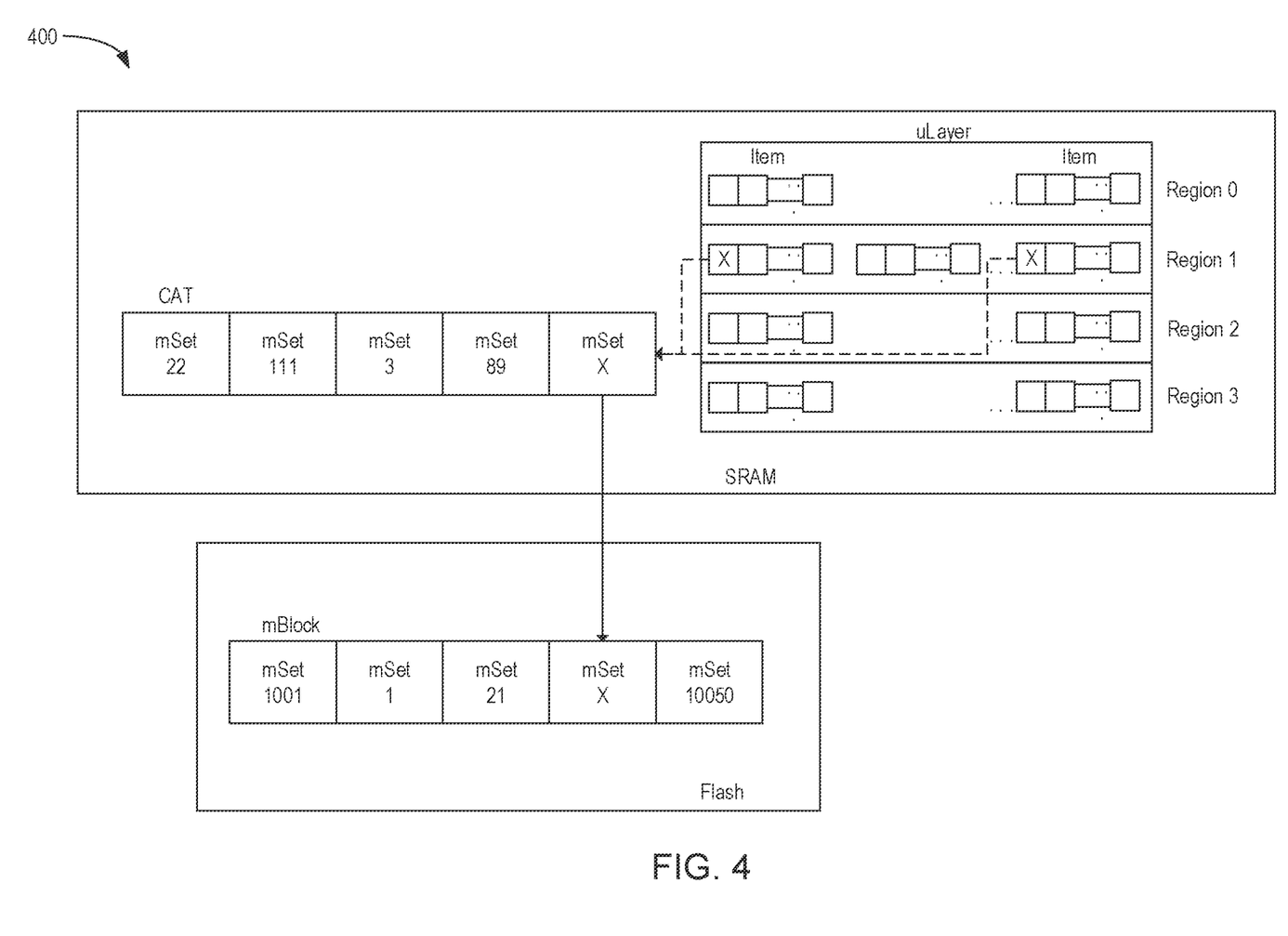
FIG. 4 is an illustration of a consolidation process performed on an uRegion.

FIG. 4 is an illustration 400 of a consolidation process performed on an uRegion. The consolidation process is typically triggered for an uRegion that has the most remaining updates waiting within the uRegion. Then, all mSets associated with the selected uRegion are copied from mBlocks located on the flash to CAT memory located in SRAM. There, the updates in the uRegion are combined and written to their associated mSets. After the mSets have been fully updated, the new mSets are stored back to a new mBlock in the flash.

Figure 5:
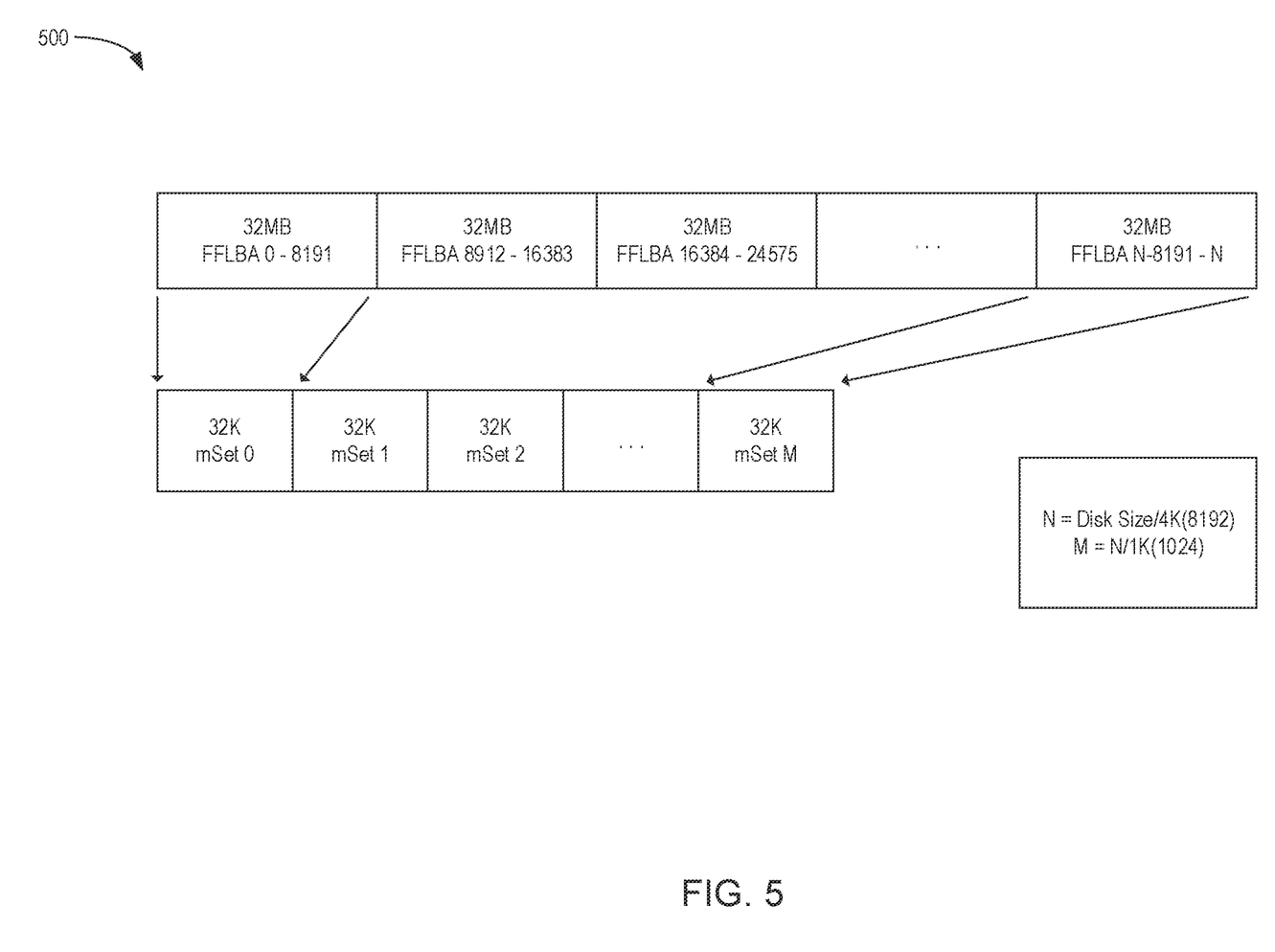
FIG. 5 is an illustration demonstrating the usage of master sets (mSets).

FIG. 5 is an illustration 500 demonstrating the usage of mSets to represent FFLBA ranges. mSets are mappings of logical address into a media address. Each 32 MB of host LBA is represented by an mSet of 32K size. Each 4K of LBA is called an FFLBA. Therefore the first 32K mSet represents FFLBA 0 to FFLBA 8191, 32 MB of host FFLBA. Whenever a write changes logical address information, the update for the associated mSet is stored in an uRegion until consolidation is triggered.

Figure 6:
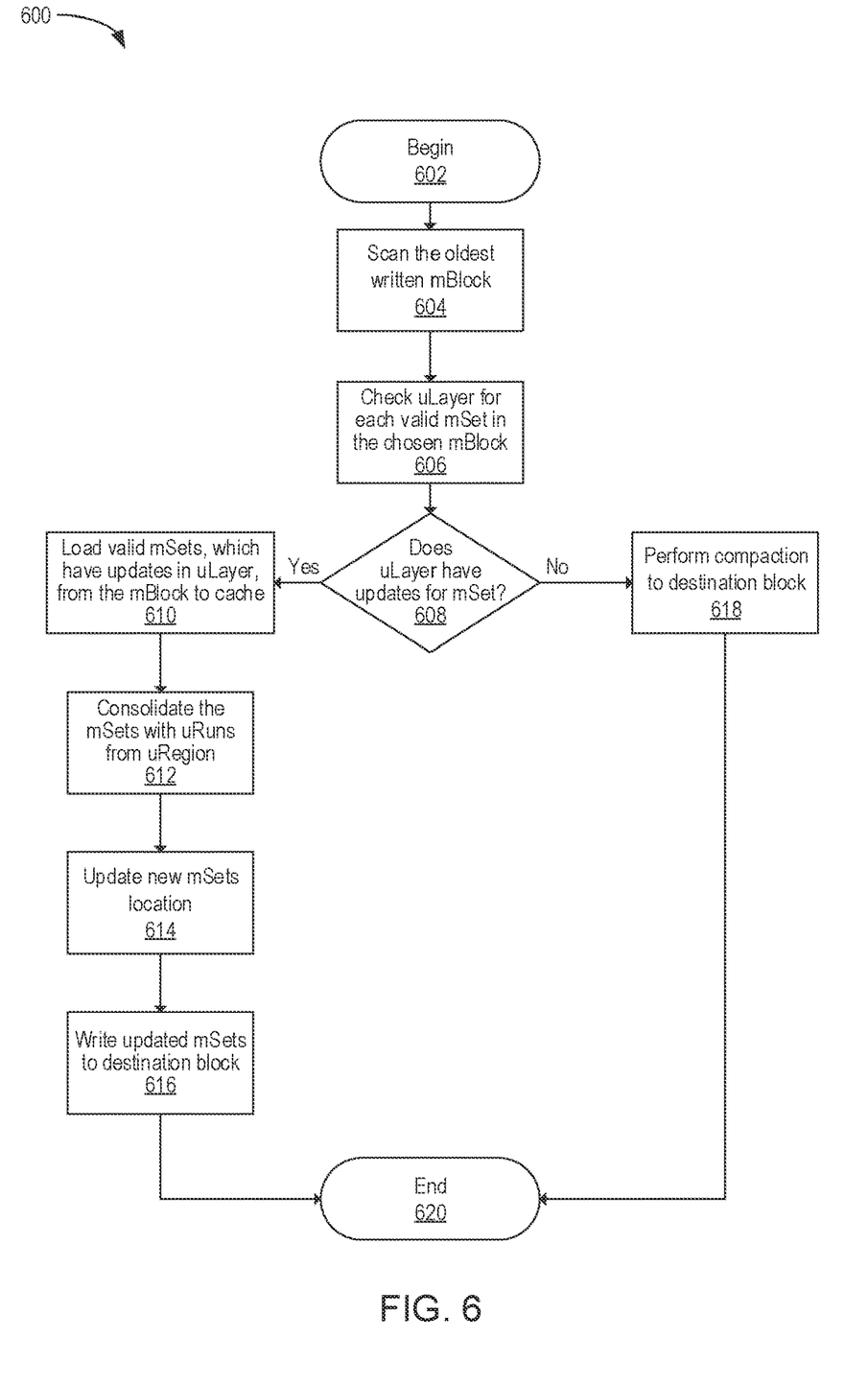
FIG. 6 is a block flow diagram of a method of synchronizing compaction and consolidation processes, according to certain embodiments.

FIG. 6 is a block flow diagram 600 of a method of synchronizing compaction and consolidation processes, according to certain embodiments. In order to manage uLayer uRegions more efficiently, the operations of compaction and consolidation can be synchronized such that the smaller uLayer efficacy will not be reduced due to trapped uRegions that are less frequently updated.

In the block flow diagram 600, after starting with block 602, the device begins by scanning the flash memory for the oldest written mBlock at 604. The scanning always occurs in the background and occasionally in the foreground. The oldest written mBlock is selected as the oldest mBlock is likely to have updates that are in an uRegion, and those updates may likely have been trapped in an uRegion. The data storage device may identify the oldest written mBlock by tracking the order in which the data storage device has closed mBlocks. Generally, the uRegion is not associated with only one mBlock. Rather, the uRegion contains updates associated with mSets that might be written to different mBlocks, Hence, scanning for the oldest written mBlock is used to check each valid mSet.

After the oldest mBlock is identified, the data storage device checks the uLayer for each valid mSet in the chosen mBlock at 606. The updates in the selected mBlock should be found in the uRegions associated with the valid mSets located in the selected mBlock.

If the uLayer contains at least one update for valid mSets in the mBlock at block 608, the flow continues to 610, where the device writes valid mSets, which have updates in the uLayer, located in the selected oldest mBlock to cache address table (CAT) cache memory in SRAM. The CAT contains a part of the mSets in the data storage device RAM and is relatively small for DRAM-less data storage devices. For example, a CAT size may be 10-100 mSets. For consolidation, mSets should be loaded from mBlock to CAT and merged with uLayer updates and then saved to an open mBlock. The device then performs consolidation on the mSets with uRuns from the uRegion with the at least one update at block 612, updating new mSets location at 614 and freeing the space in the uLayer.

The updated mSets is then written back to the destination block in flash memory, to a new destination block rather than the original location that the mBlock was copied from at 616 before the flow ends at 620.

If the uLayer did not contain any updates for the selected mBlock at 608, then the flow proceeds to 618, where the device performs compaction on the mBlock by removing any obsolete mSets and writing the new mSet to a new destination block.

Figure 7:
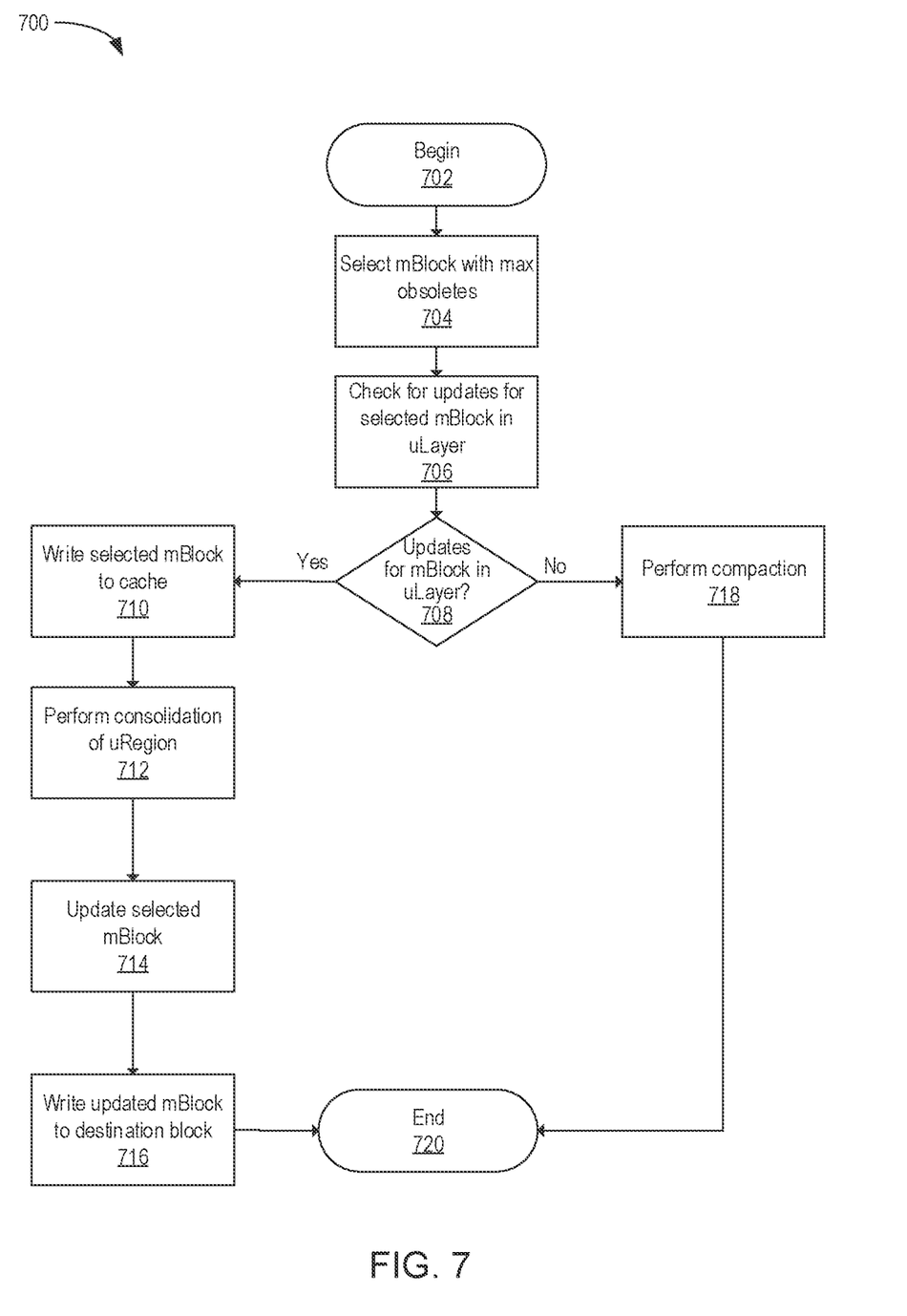
FIG. 7 is a block flow diagram of a second method of synchronizing compaction and consolidation processes, according to certain embodiments.

FIG. 7 is a block flow diagram 700 of a second method of synchronizing compaction and consolidation processes, according to certain embodiments.

After starting with 702, the device selects an mBlock with max obsolete mSets at 704 like a normal start for a standard compaction process. However, unlike compaction, after the mBlock has been selected the device checks for updates for the selected mBlock in the uLayer at 706.

If the uLayer contains updates for the mBlock at 708, the flow proceeds to 710, where the selected mBlock, and all comprising valid mSets of the mBlock, are written from flash to cache memory in SRAM. The device performs consolidation on any uRegions that contain updates for the mSets of the selected mBlock at 712. The mSets of the mBlock are updated at 714, allowing the uLayer to free the space that the updates had been waiting in. The updated mBlock is then rewritten to flash memory at a new destination block distinct from the original source block of the mBlock at 716 before ending the flow at 720.

If the uLayer did not contain any updates for the selected mBlock at 708, then the flow continues to 718, where the standard compaction process may occur. The mBlock is scanned for valid mSets, and the valid mSets are copied to a destination block before the flow ends at 720.

As discussed herein, the disclosure is applicable to dual-layered FTL architectures where uLayer's LBA space can be (or cannot be) split into a set of uRegions controller by per-uRegion uHeaders. The disclosure proposed to trigger consolidation of the trapped uRegions by replacing mBlock compaction with consolidation of mSets if the uRegions have at least one uRun in the mSets. The rule might be used in at least two flows: special scanning of the oldest written mBlock (always in the background and occasionally in the foreground); and additional checking of trapped uRegions during scanning of selected mBlock with max obsoletes for compactions. The special scanning involves saving the order of closing of mBlocks where usually the number of mBlocks is 10-15. There should be fun tuning for the proportion between normal consolidation for releasing maximum space in uLayer and the specific consolidation for trapped uRegions. The embodiments of the disclosure will improve uLayer memory usage and reduce write amplifications. Additionally, the embodiments of the disclosure will increase the overall device performance and reduce the latency.

In one embodiment, a data storage device comprises: a memory device and a controller coupled to the memory device, wherein the controller is configured to determine a compaction process to be performed for one or more mBlocks, wherein the one or more mBlocks comprise one or more mSets; check a uLayer for updates for the one or more mSets; consolidate uRegions with at least one update for the one or more mSets; update the one or more mSets with the consolidated uRegions with at least one update; and write the updated one or more mSets to a destination block. Determining a relocation process to be performed comprises finding an oldest written mBlock. The oldest written mBlock is identified by the controller tracking an order of mBlocks being closed historically. Determining a relocation process to be performed comprises finding an mBlock with a most number of obsolete mSets. The uLayer comprises one or more uRegions controlled by per-uRegion uHeaders. Checking the uLayer for updates comprises the controller scanning the one or more uRegions for uRuns that are associated with one or more outdated mSets in a selected mBlock, Consolidating uRegions with at least one update comprises writing the at least one update to the one or more associated outdated mSets of the selected mBlock and freeing the uRegions with at least one update. Updating the one or more mSets comprises writing the outdated mSet to cache memory in Static Random Access Memory (SRAM) and combining with the at least one update. Writing the updated one or more mSets to a destination block comprises copying the updated one or more mSets from cache memory in SRAM and writing to a memory block distinct from where the outdated mSet was written.

In another embodiment, a data storage device comprises: a memory device and a controller coupled to the memory device, wherein the controller is configured to select a source block for relocation, wherein the source block comprises a valid mSet, update the valid mSet, and write the updated valid mSet to a destination block. The valid mSet is disposed in a uRegion that has either not been filled or that has not been used for a predetermined period of time. Validity of an mSet is identified by a validity bitmap set by the controller. Updating the valid mSet comprises writing the mSet to cache memory and combining the mSet with updates associated with the mSet. Writing the updated valid mSet to a destination block comprises selecting a block in the memory device distinct from the source block selected for relocation. Selecting a source block for relocation comprises selecting the source block with a most number of obsolete mSets. Selecting a source block for relocation comprises identifying and selecting an oldest written source block. Identifying the oldest written source block comprises the controller tracking a history of an order of source blocks being closed.

In another embodiment, a data storage device comprises: a memory means and a controller coupled to the memory means, wherein the controller is configured to determine an mBlock in a first location needs relocation, combine the mBlock with uLayer updates, and write the combined mSet and uLayer updates as a new mSet in a second location distinct from the first location. The first location and second location are disposed in the memory means. Wherein combining the mSet and uLayer updates occurs in a memory location distinct from the memory means. Combining the mSet with uLayer updates comprises scanning the uLayer for updates associated with one or more mSets in the mBlock and writing the update to the one or more mSets.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   determine a compaction process to be performed for one or more mBlocks, wherein the one or more mBlocks comprise one or more mSets;
   check a uLayer for updates for the one or more mSets;
   consolidate uRegions with at least one update for the one or more mSets;
   update the one or more mSets with at least one update, wherein the uLayer comprises one or more uRegions controlled by per-uRegion uHeaders; and
   write the updated one or more mSets to a destination block.

2. The data storage device of claim 1, wherein determining a compaction process to be performed comprises finding an oldest written mBlock, wherein the oldest written mBlock is identified by the controller tracking an order of mBlocks being closed historically.

3. The data storage device of claim 1, wherein determining a compaction process to be performed comprises finding an mBlock with a most number of obsolete mSets.

4. The data storage device of claim 1, wherein checking the uLayer for updates comprises the controller scanning the one or more uRegions for uRuns that are associated with one or more outdated mSets in a selected mBlock.

5. The data storage device of claim 4, wherein consolidating uRegions with at least one update comprises writing the at least one update to the one or more associated outdated mSets of the selected mBlock and freeing the uRegions with at least one update.

6. The data storage device of claim 1, wherein updating the one or more mSets comprises writing an outdated mSet to cache memory in Static Random Access Memory (SRAM) and combining with the at least one update.

7. The data storage device of claim 6, wherein writing the updated one or more mSets to a destination block comprises copying the updated one or more mSets from cache memory in SRAM and writing to a memory block distinct from where the outdated mSet was written.

8. A data storage device, comprising:
   a memory device; and
   a controller coupled to the memory device, wherein the controller comprises a dual-layered mapping architecture consisting of a mLayer and a uLayer, wherein the uLayer is smaller in size than the mLayer, wherein the mLayer is an array of physical locations indexed by logical locations, wherein the uLayer is an update layer that aggregates updates for data, wherein the uLayer can be consolidated to the mLayer, wherein the uLayer comprises one or more uRegions controlled by per-uRegion uHeaders, wherein the controller is configured to:
   select a source block for relocation, wherein the source block comprises a valid mSet;
   update the valid mSet; and
   write the updated valid mSet to a destination block.

9. The data storage device of claim 8, wherein the valid mSet is disposed in a uRegion that has either not been filled or that has not been used for a predetermined period of time.

10. The data storage device of claim 8, wherein validity of an mSet is identified by a validity bitmap set by the controller.

11. The data storage device of claim 8, wherein updating the valid mSet comprises writing the mSet to cache memory and combining the mSet with updates associated with the mSet.

12. The data storage device of claim 8, wherein writing the updated valid mSet to a destination block comprises selecting a block in the memory device distinct from the source block selected for relocation.

13. The data storage device of claim 9, wherein selecting a source block for relocation comprises selecting the source block with a most number of obsolete mSets.

14. The data storage device of claim 8, wherein selecting a source block for relocation comprises identifying and selecting an oldest written source block.

15. The data storage device of claim 14, wherein identifying the oldest written source block comprises the controller tracking a history of an order of source blocks being closed.

16. A data storage device, comprising:
   memory means; and
   a controller coupled to the memory means, wherein the controller comprises a dual-layered mapping architecture consisting of a mLayer and a uLayer, wherein the uLayer is smaller in size than the mLayer, wherein the mLayer is an array of physical locations indexed by logical locations, wherein the uLayer is an update layer that aggregates updates for data, wherein the uLayer can be consolidated to the mLayer, wherein the uLayer comprises one or more uRegions controlled by per-uRegion uHeaders, wherein the controller is configured to:
- determine an mBlock in a first location needs relocation;
- combine the mBlock with uLayer updates; and
- write the combined mBlock and uLayer updates as a new mSet in a second location distinct from the first location.

17. The data storage device of claim 16, wherein the first location and second location are disposed in the memory means.

18. The data storage device of claim 16, wherein combining the mSet and uLayer updates occurs in a memory location distinct from the memory means.

19. The data storage device of claim 18, wherein combining the mSet with uLayer updates comprises scanning the uLayer for updates associated with one or more mSets in the mBlock and writing the update to the one or more mSets.

* * * * *